United States Patent [19]

Sauvinet et al.

[11] Patent Number: 5,105,759
[45] Date of Patent: Apr. 21, 1992

[54] PROCESS TO CHANGE THE RELATIVE POSITIONS OF A PLURALITY OF ALIGNED ELEMENTS AND DEVICE FOR USING THIS PROCESS

[75] Inventors: Vincent Sauvinet, Paris; Michel Pichon, Gouvieux; Pascal Gerardin, Compiegne, all of France

[73] Assignee: Saint Gobain Vitrage International, Courbevoie, France

[21] Appl. No.: 506,283

[22] Filed: Apr. 6, 1990

[30] Foreign Application Priority Data

Apr. 12, 1989 [FR] France .................. 89 04791

[51] Int. Cl.⁵ .............................................. B05C 19/04
[52] U.S. Cl. .................................. 118/308; 118/310; 118/313; 118/315; 211/1.5
[58] Field of Search .............. 118/308, 310, 313, 315, 118/325, 665; 239/173, 210; 211/1.5; 248/651, 662

[56] References Cited

U.S. PATENT DOCUMENTS

| | | | |
|---|---|---|---|
| 3,785,474 | 1/1974 | Nakamoto | 211/1.5 |
| 4,296,658 | 10/1981 | Champeau | 82/30 |
| 4,813,311 | 3/1989 | Hebbruggen | 82/117 |
| 4,872,417 | 10/1989 | Kawabara et al. | 118/313 |
| 4,933,211 | 6/1990 | Sauvinek et al. | 118/308 |
| 5,007,351 | 4/1991 | Muth | 211/1.5 |

FOREIGN PATENT DOCUMENTS 2535973 2/1977 Fed. Rep. of Germany .

Primary Examiner—Richard V. Fisher
Assistant Examiner—Charles K. Friedman
Attorney, Agent, or Firm—Pennie & Edmonds

[57] ABSTRACT

A plurality of injector elements are mounted on a frame and within a nozzle above a subjacent support for depositing a layer of pulverulent product on the support. In order to change the predetermined spacing of the injectors, they are selectively connected to a shuttle which is moved by a digitally controlled stepping motor to a predetermined position, after which they are separated from the shuttle. A solenoid mounted on each of the injectors can be activated to frictionally hold the injector at its predetermined position.

12 Claims, 2 Drawing Sheets

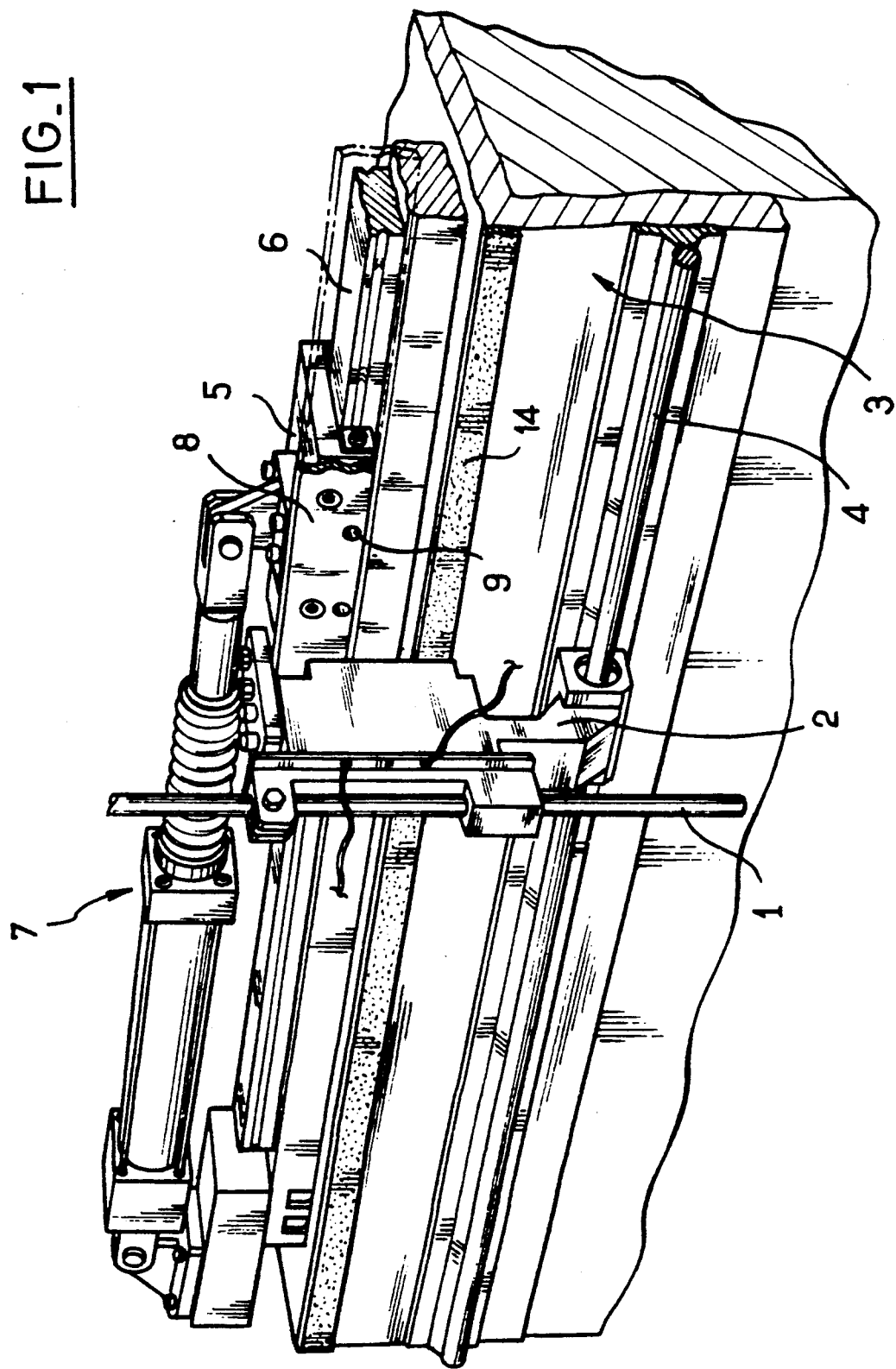

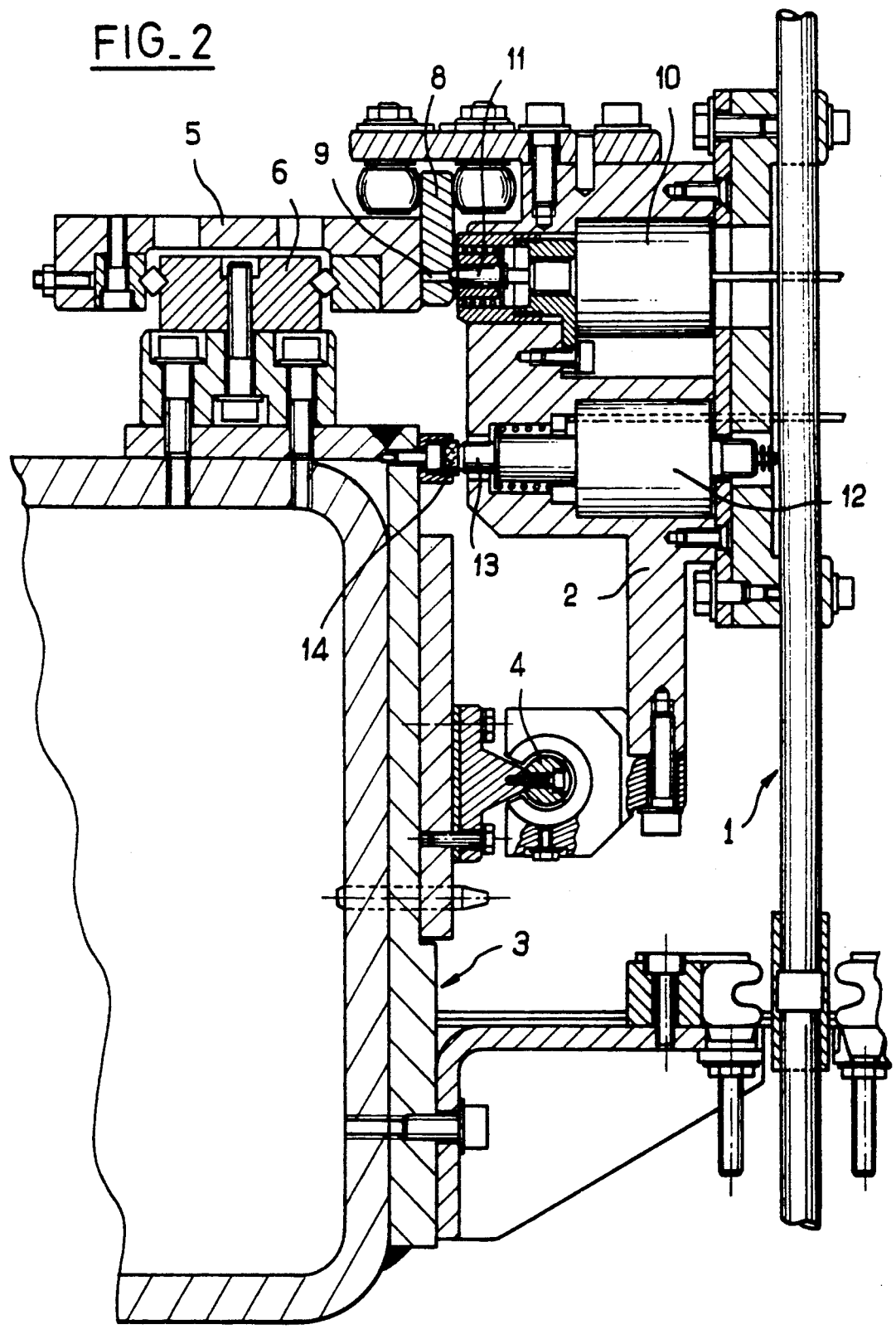

PROCESS TO CHANGE THE RELATIVE POSITIONS OF A PLURALITY OF ALIGNED ELEMENTS AND DEVICE FOR USING THIS PROCESS

BACKGROUND OF THE INVENTION

1. Field of the Invention

This invention relates to a process to change the relative positions of a plurality of elements aligned in a first configuration so as to place them, on line, in a second configuration. The invention also relates to a device for using this process. In particular, the invention relates to a process and device to automatically change the relative positions of injectors (also called feed tubes) for pulverulent products in suspension in a gas, in which the injectors are held in a distribution nozzle and spray the pulverulent product on an advancing subjacent support in order to obtain on this support a film with particular properties.

2. Background of the Related Art

It is known, particularly from patent FR 2 427 141 and European patent application A-125 153, to continuously distribute on an advancing substrate, such as a ribbon of glass, pulverulent products in suspension in a gas, through a distribution slot placed above the substrate and extending crosswise to the direction of movement of the latter. This slot comprises the lower end of a distribution device also called a nozzle, which has a cavity extending over the entire length of the slot. This cavity is fed with pulverulent products in suspension in a gas by a series of injectors aligned parallel to the slot, i.e., crosswise to the direction of movement.

The processes and devices described in these patents serve to form on a substrate, for example on a ribbon of glass, a thin layer having particular properties, particularly optical or electrical properties. To obtain appropriate constant properties over the entire surface of the substrate, it is necessary that the layer not exhibit variations in thickness, or else only very slight such variations.

Despite mixing by creating turbulences in the gas carrying the pulverulent product, despite the introduction of additional gas in the nozzle to regulate the distribution of pulverulent product in time and in space, it has been observed that vertically below each of the injectors of pulverulent product there is formed a deposit, called a trace, of a certain width and whose thickness is non-constant over this width, the maximum thickness being located approximately on the axis of the injector. All of these traces, due to their at least partial overlapping, form the layer deposited on the substrate. When all the injectors fed with pulverulent product are suitably spaced, the overlapping of the traces of each injector leads to a homogeneous deposit. When the deposit is not homogeneous, as a result of too great or too little a thickness in a given area, the distance between the injectors is changed, which has the effect of changing the overlapping of the traces. Thus, when the coating is too thick in an area, the injectors are separated, and when the thickness is insufficient, the distance is reduced between the injectors to obtain, over the entire substrate, a uniform thickness.

The uniformity of the coating, and consequently that of its thickness, is determined by measuring the variations in the reflection of the light by the coating, by using an apparatus called a spotmeter. This measurement of the reflection makes it possible to determine the thickness value governed initially by the regulation of the flow of the pulverulent product. If the measurement indicates that the thickness is not suitable, the arrival of pulverulent product is then cut off to permit changing the distances between the injectors as a function of the observed defect, i.e., as has already been described, by moving the injectors apart or by bringing them closer together, depending on whether the thickness is too great or too small.

This process has many drawbacks. For example, the reflection measurements take place off the production line on a crosswise strip of glass 100 mm wide. These measurements, therefore, can be performed only after a certain time after the appearance of the defects in the coating. In addition, corrections based upon these measurements require additional time, with the result that about 30 min. elapse between the production of the glass that is being controlled and the control operation.

Since up to 30 min. are required to adjust distances between the injectors, and since the speed of advance of the ribbon of glass can vary between 6 and 25 m/min, it can be appreciated that the production loss which can result, and which corresponds not only to the amount of glass treated before the optical measurement but also to the glass surface which could have been produced during the period of adjusting the distances between injectors, is quite high. The production capacity is thus limited.

Therefore, it is necessary to find a system making possible a quick adjustment of the distances between the injectors as soon as the defects have been determined by the optical measurement.

SUMMARY OF THE INVENTION

The invention therefore has as an object a process, and a device using this process, which makes it possible to change quickly, preferably automatically, the relative positions of the injectors of pulverulent products which serve to feed a distribution nozzle which deposits these products on a subjacent advancing substrate and also, more generally, any system comprising a plurality of elements aligned in a first configuration, to place them in an aligned second configuration.

The process, according to the invention, to change the relative positions of a plurality of elements aligned in a first configuration to place them, on line, in a second configuration includes the steps of selectively coupling at least one of the elements to a shuttle that is movable parallel to the alignment of the elements, displacing the shuttle and the element or elements which are coupled to it from an initial position to a predetermined position, and uncoupling the shuttle from the element or elements after their installation in the predetermined position until all of the elements are in their predetermined positions.

Preferably, the coupling of the elements to the shuttle and the displacement of the latter is computer controlled.

The device for using the process for changing the relative positions of aligned elements, according to the invention, is characterized in that said elements are mounted to move on a common frame and wherein at least one shuttle is movable parallel to the alignment of the elements. Means are provided to selectively couple the shuttle and at least one of said elements and means are provided to displace the shuttle and the element or elements which are coupled to it from an initial position to a predetermined position.

According to an embodiment, the elements are each associated with a carriage mounted to move on the frame which is common to all the carriages.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a view in perspective of a device according to the invention; and

FIG. 2 is a view in cross section of the device of FIG. 1.

DETAILED DESCRIPTION OF THE PREFERRED EMBODIMENT

The invention will now be illustrated in a nonlimiting application to the displacement of injectors, or feed tubes, of powder, aligned rectilinearly, from a first to a second configuration, in which the relative spacing of at least one of the aligned injectors is altered.

FIG. 1 shows an injector (1) constituting one of the elements to be displaced to go from one configuration to the next. It should be emphasized that there are in fact several such injectors, only a single one of them being shown in FIG. 1 for reasons of clarity. Injector (1) is mounted on a carriage (2) that is movable on a rail (4) fastened to a rectilinear frame (3). Frame (3) is common to a group of carriages which each carry one of injectors (1). A shuttle (5) is movable on a slide (6) fastened to frame (3) and it is driven by a driving element (7) such as a cylinder, for example. Shuttle (5) includes a plate (8) situated in a plane parallel to the travel of the carriage. Plate (8) of shuttle (5) is provided with a plurality of bores (9) spaced along a line parallel to the direction of the travel of the carriage. These bores (9) are opposite the core 11 (FIG. 2) of an electromagnet (i.e., solenoid) (10) mounted on carriage (2). The core 11 is movable between a retracted position, which corresponds to a noncoupling with the shuttle, and a projecting position making it possible for the end of the core to enter one of the bores (9) of plate (8) of the shuttle for the crosswise displacement of the carriage. It should be emphasized that the frame and aligned injectors are positioned in the cavity of a distribution nozzle (not shown) and extend crosswise to a subjacent moving support (not shown).

Cylinder (7) which drives the shuttle in translation on slide (6) can be a digitally controlled electric stepping motor.

Advantageously, the device can, in addition, include friction coupling means between frame (3) and each of carriages (2) to hold the latter in a stationary position relative to frame (3) after its installation by shuttle (5) in a predetermined position. These friction coupling means comprise, for example, a second electromagnet (i.e., solenoid) (12) mounted on carriage (2) and whose core (13) is movable between a retracted position, making possible the displacement of the carriage by the shuttle, and a projecting position in which it bears on a roughened area (14) of frame (3) to provide the friction coupling.

To automate the reconfiguration of the relative positions of the various aligned elements, the means for coupling the carriages to the shuttle, the means for friction coupling of the carriages to the frame and displacement cylinder (7) of the shuttle, are digitally controlled by a suitably programmed computer comprising the control device 100.

Thus, during production, a sample of coated glass ribbon is taken, as has been previously indicated, by cutting off a relatively narrow crosswise strip from this ribbon and the reflectivity of this strip is measured over its entire length with an apparatus, such as a sweeping spotmeter (not shown).

The measurements are digitized with an analog to digital converter and provided to the computer 100, (such as an IBM PC computer) loaded with software for using these measurements to deduce possible corrections in the spacing of the injectors. Such corrections result from control signals delivered from the computer to the stepping motor to cause the stepping motor to incrementally operate so as to rearrange the injectors in a second configuration able to cause the defects in uniformity detected by the spotmeter to disappear.

The reflectivity measurements are preferably made directly on the moving glass ribbon to avoid stopping production.

In operation, the device according to the invention, on the command of the computer, modifies the displacement of shuttle (5), while the core (11) is retracted and the core (13) is advanced, so as to put one of bores (9) of plate (8) opposite core (11) of electromagnet (10). The computer then controls the excitation of this electromagnet (10) so that the end of core (11) of electromagnet (10) enters the bore (9) which is opposite to it, which has the effect of making carriage (2) and shuttle (5) integral. Second electromagnet (12), serving as friction coupling means between frame (3) and carriage (2), is then operated to retract its core (13) and uncouple carriage (2) from frame (3). Carriage (2) is then coupled solely to shuttle (5).

The computer then orders the movement of the latter, driven by cylinder (7), by a determined distance. The shuttle is advantageously displaced by a plurality of incremental steps of, for example, 0.25 mm. When the carriage occupies the desired position, the computer controls second electromagnet (12) so that its core advances and occupies a projecting position making it possible for its to bear on roughened area (14) of frame (3) to assure the immobilization of carriage (2) on this frame (3).

Electromagnet (10) is then controlled so that its core (11) is retracted and uncouples carriage (2) and shuttle (5).

Shuttle (5) is then again displaced to put one of the bores (9) of plate (8) opposite another carriage to be displaced. The preceding process is repeated to change the positions of the various carriages and to place them in the new desired configuration.

Optionally, shuttle (5) can be simultaneously coupled to several carriages, each then cooperating with one of the bores (9) provided in plate (8) to be displaced simultaneously.

The process and the device according to the invention, described above, are particularly suited for automatically changing the positions of injectors useful for the feeding of pulverulent products via a distribution nozzle, as described in the previously cited patents, for spraying these products on an advancing subjacent substrate, such as a glass ribbon to form a layer there of particular properties. The invention actually makes a quick, and automatic, adjustment of the distances between the injectors possible as soon as the defect in homogeneity of the layer, mentioned above, has been detected. The time that elapses between the moment of the detection of the defects in the layer and that when the spraying can be resumed after the adjustment of the distances of the injectors can be reduced to 30 min., for example. The invention therefore exhibits the advantages of making interventions on the production line easier, and of reducing the time for those interventions as well as the loss of production.

The process and the device according to the invention can obviously be usable in any system comprising aligned elements whose relative positions are to be changed.

What is claimed as new and desired to be secured by Letters Patent of the United States is:

1. An apparatus for coating a moving subjacent support with a pulverulent product, said apparatus comprising:

a frame extending in a crosswise direction over the moving subjacent support;

a plurality of aligned injector elements mounted on said frame for movement along the length of the frame, each of said injector elements injecting the pulverulent product as a layer on the support;

a shuttle mounted on said frame for movement in the direction of alignment of said elements, whereby said shuttle can selectively move adjacent to each of said elements;

means for moving said shuttle; and means for selectively coupling said shuttle to at least one of said elements, whereby the relative positions of said elements on said frame may be selectively changed so as to produce a uniform pulverulent product layer.

2. The apparatus of claim 1 wherein each of said injector elements comprises a carriage mounted on said frame and an injector mounted to said carriage.

3. The apparatus of claim 2 wherein said means for selectively coupling comprise at least one bore in said shuttle, and a solenoid mounted on each carriage and having a core movable into a selected one of said bores to couple the shuttle to the element on which the solenoid is mounted.

4. The apparatus of claim 3 wherein said shuttle comprises a plate positioned parallel to the direction of movement of said elements, said at least one bore being formed in said plate, and wherein said at least one bore comprises a plurality of bores spaced in the direction of movement of said elements.

5. The apparatus of claim 4 wherein said means for moving comprise a digitally controlled stepping motor.

6. The apparatus of claim 5 including friction coupling means for fixing a position of each element on said frame.

7. The apparatus of claim 6 wherein said friction coupling means comprise:

a high friction area on said frame; and a second solenoid mounted on said carriage and having a core selectively engagable with said roughened area.

8. The apparatus of claim 7 including a digital control means for controlling said stepping motor, said coupling means and said friction coupling means.

9. A process for changing the relative spacing of a plurality of aligned injectors for pulverulent products positioned over a moving subjacent support, comprising the steps of:

selectively coupling at least one of said injectors to a shuttle;

moving the shuttle and the at least one of said injectors coupled thereto to a predetermined position; and uncoupling the at least one of said injectors from the shuttle.

10. The process of claim 9 including the step of frictionally blocking the position of the at least one of said injectors at the predetermined position.

11. The process of claim 9 wherein at least two of said injectors are moved simultaneously in said moving step.

12. An apparatus for coating a support with a pulverulent product, said apparatus comprising:

a frame extending in a crosswise direction over the support;

carriages mounted on said frame;

a plurality of injectors each mounted onto one of said carriages for movement along the length of said frame, each of said injectors injecting the pulverulent product as a layer on the support;

a shuttle mounted on said frame for movement along the length of said frame, said shuttle having a plurality of bores spaced in the direction of movement of said injectors, whereby said shuttle can selectively move adjacent to each of said injectors;

a solenoid mounted on each carriage and having a core movable into a selected one of said bores to couple said shuttle to the injector on which said solenoid is mounted; and means for moving said shuttle so as to selectively change the relative positions of said injectors to control the deposition of the pulverulent product layer by said injectors.

* * * * *